(12) United States Patent  (10) Patent No.: US 9,372,579 B2
Philipp  (45) Date of Patent: Jun. 21, 2016

(54) TOUCHSCREEN ELECTRODE ARRANGEMENT

(75) Inventor: Harald Philipp, Hamble (GB)

(73) Assignee: Atmel Corporation, San Jose, CA (US)

( * ) Notice: Subject to any disclaimer, the term of this patent is extended or adjusted under 35 U.S.C. 154(b) by 1683 days.

(21) Appl. No.: 12/606,934

(22) Filed: Oct. 27, 2009

(65) Prior Publication Data

US 2011/0095997 A1    Apr. 28, 2011

(51) Int. Cl.
*G06F 3/041*    (2006.01)
*G06F 3/044*    (2006.01)

(52) U.S. Cl.
CPC ..................................... *G06F 3/044* (2013.01)

(58) Field of Classification Search
CPC ........... G06F 1/16; G06F 3/041; G06F 3/045; G09G 5/00; G09G 5/08
USPC ................. 345/173–179; 178/18.01
See application file for complete search history.

(56) References Cited

U.S. PATENT DOCUMENTS

| | | | |
|---|---|---|---|
| 6,323,846 B1 * | 11/2001 | Westerman et al. .......... 345/173 |
| 7,663,607 B2 | 2/2010 | Hotelling |
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 2006/0032680 A1 * | 2/2006 | Elias et al. .................. 178/18.06 |
| 2009/0315854 A1 | 12/2009 | Matsuo |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |

FOREIGN PATENT DOCUMENTS

WO    WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Tony N Ngo
(74) *Attorney, Agent, or Firm* — Baker Botts L.L.P.

(57) ABSTRACT

A touchscreen display assembly has an array of first electrodes distributed across an active area of the touchscreen display assembly such that the density of first electrodes increases in a first direction across the touchscreen. An array of second electrodes is distributed across an active area of the touchscreen display assembly such that the density of second electrodes decreases in the first direction across the touchscreen. The position in the first direction of an input on the touchscreen can be determined by the proportion of first and second electrodes density in the area of the input.

22 Claims, 14 Drawing Sheets

SIGNAL vs. DISPLACEMENT
ACROSS TOUCH ZONE

WEIGHTED CONTRIBUTION
OF EACH X LINE

| A | A | A | A | A | A | A | B | A | A | A | B |
|---|---|---|---|---|---|---|---|---|---|---|---|
| 0.1 | 1.2 | 3.6 | 15.8 | 18.9 | 19.0 | 17.2 | 9.6 | 3.7 | 1.0 | 0.6 | 0.2 |

| ZONE | | GROUP SEQUENCE |
|---|---|---|
| A1 5:0 | A:B | AAAAA, |
| A2 4:1 | | ABAAA, |
| A3 3:2 | | BAABA, |
| A4 3:2 | | BABBA, |
| A5 1:4 | ↓ | BBBAB, |
| B1 0:5 | C:B | BBBBB, |
| B2 1:4 | | BCBBB, |
| B3 2:3 | | CBBCB, |
| B4 3:2 | | CBCCB, |
| B5 4:1 | ↓ | CCCBC, |
| C1 5:0 | C:D | CCCCC, |
| C2 4:1 | | CDCCC, |
| C3 3:2 | | DCCDC, |
| C4 2:3 | | DCDDC, |
| C5 1:4 | ↓ | DDDCD, |
| D1 0:5 | E:D | DDDDD, |
| D2 1:4 | | DEDDD, |
| D3 2:3 | | EDDED, |
| D4 3:2 | | EDEED, |
| D5 4:1 | ↓ | EEEDE, |
| E1 5:0 | E:F | EEEEE... |

SEQUENCE USING 5 UNIQUE X
DRIVE LINES IN GROUPINGS OF 5

*Fig. 8*

| ZONE | | GROUP SEQUENCE |
|---|---|---|
| A1 7:0 | A:B | AAAAAAA, |
| A2 6:1 | | AABAAAA, |
| A3 5:2 | | BAAABAA, |
| A4 4:3 | | BABAABA, |
| A5 3:4 | | BBABBAA, |
| A6 2:5 | | BBABBBA, |
| A7 1:6 | ↓ | BBBABBB, |
| B1 0:7 | C:B | BBBBBBB, |
| B2 1:6 | | BBBCBBB, |
| B3 2:5 | | BBCBBBC, |
| B4 3:4 | | BBCBBCC, |
| B5 4:3 | | BCBCCBC, |
| B6 5:2 | | BCCCBCC, |
| B7 6:1 | ↓ | CCBCCCC, |
| C1 7:0 | C:D | CCCCCCC, |
| C2 6:1 | | CCDCCCC, |
| C3 5:2 | | DCCCDCC, |
| C4 4:3 | | DCDCCDC, |
| C5 3:4 | | DDCDDCC, |
| C6 2:5 | | DDCDDDC, |
| C7 1:6 | ↓ | DDDCDDD, |
| D1 0:7 | E:D | DDDDDDD... |

SEQUENCE USING 4 UNIQUE X
DRIVE LINES IN GROUPINGS OF 7

*Fig. 9*

TOUCHSCREEN ELECTRODE ARRANGEMENT

BACKGROUND

Touchscreen displays are able to detect a person's touch within the active or display area, such as detecting whether a finger is present pressing a fixed-image touchscreen button or detecting the presence and position of a finger on a larger touchscreen display. Some touchscreens can also detect the presence of elements other than a finger, such as a stylus used to generate a digital signature, select objects, or perform other functions on a touchscreen display.

Touchscreens are often used as interfaces on electronic devices, appliances, and other such electronic systems because the display behind the touchscreen can be easily adapted to provide instruction to the user and to receive various types of input, thereby providing an intuitive interface that requires very little user training to use effectively. Inexpensive and efficient touchscreen technologies enable incorporation of touchscreens into inexpensive commercial devices, but these inexpensive technologies should also desirably be durable and have relatively high immunity to noise, moisture or dirt, or other unintended operation to ensure reliability and longevity of the touchscreen assembly. These desirable attributes also largely apply to other input devices such as trackpads and pen entry tablets.

Use of a touchscreen as part of a display also allows an electronic device to change the display image, presenting different buttons, images, or other regions that can be selected, manipulated, or actuated by touch. Touchscreens can therefore provide an effective user interface for cell phones, GPS devices, personal digital assistants (PDAs), computers, ATM machines, and other such devices.

Touchscreens use various technologies to sense touch from a finger or stylus, such as resistive, capacitive, infrared, and acoustic sensors. Resistive sensors rely on touch to cause two resistive elements overlaying the display to contact one another completing a resistive circuit, while capacitive sensors rely on the capacitance of a finger changing the capacitance detected by an array of elements overlaying the display device. Infrared and acoustic touchscreens similarly rely on a finger or stylus to interrupt infrared or acoustic waves across the screen, indicating the presence and position of a touch.

Minimizing process steps to produce the touchscreen overlay and minimizing external wiring connections further reduce the cost of producing such a touchscreen display, and makes interfacing the display with electronic control circuitry more straightforward and reliable. Reducing wiring density and number also reduces the number of pins required on a controller chip used to drive the electrode array, which can result in significant space and cost savings. Additionally, it is desirable to reduce the layer count of the touchscreen assembly to reduce cost, reduce light absorption or other optical effects (in applications where this is important), and to increase production yields. Various methods have been proposed and implemented in prior designs to simplify electrode wiring requirements, but often at the expense of other design compromises such as reduced touch resolution or added complexity or cost in other areas.

Capacitive and resistive touchscreens often use transparent conductors such as indium tin oxide (ITO) or transparent conductive polymers to form an array over the display image, so that the display image can be seen through the conductive elements used to sense touch. The size, shape, and pattern of circuitry have an effect on the accuracy of the touchscreen, as well as on the visibility of the circuitry overlaying the display. Although a single layer of most suitable conductive elements is difficult to see when overlaying a display, multiple layers can be easier to see, and circuitry patterns that align closely with patterns on the display can form visible interference or moiré patterns.

Further, more complex patterns of touchscreen elements can require more complex routing of lines connecting the elements to external circuitry used to sense touch, such as external circuitry that drives various touchscreen elements and that detects capacitance between multiple touchscreen elements.

For these and other reasons, efficient and effective design of touchscreen display elements is desired.

SUMMARY

A touchscreen assembly includes an array of pairs of electrode elements distributed across an active area of the touchscreen display assembly, such that the density of elements varies to create a sensing gradient. The position of an input on the touchscreen can be determined by the proportion of density of the pairs of elements in the area of the input.

BRIEF DESCRIPTION OF THE FIGURES

FIG. 8 illustrates an example touchscreen electrode sequence of five unique drive electrodes in groupings of five according to an example embodiment.

FIG. 9 illustrates an example touchscreen electrode sequence of four unique drive electrodes in groupings of seven according to an example embodiment.

DETAILED DESCRIPTION

Figure 1:
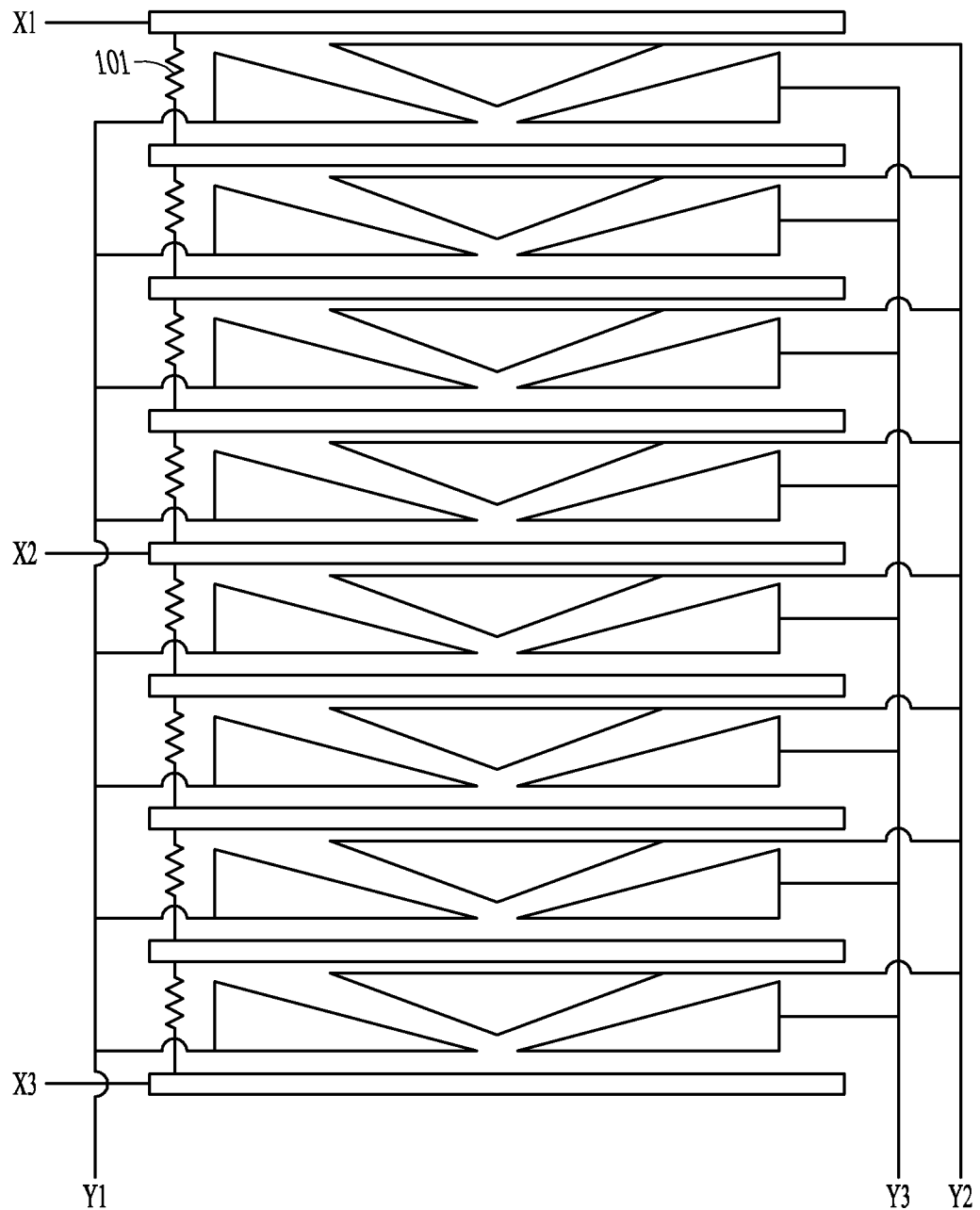
FIG. 1 shows a touchscreen assembly using a resistor network coupling touchscreen elements, consistent with the prior art.

Touchscreens include a wide variety of one-dimensional and two-dimensional geometries as may be used to form a slider, wheel, trackpad, tablet, or touchscreen, whether opaque, translucent or transparent, and can be used with a finger, stylus, pen, or other actuation method or device. The word 'touchscreen' will here be used to include any of the foregoing types of geometries or characteristics.

Capacitive touchscreens are able to detect a person's touch within an active area, and report to a host device the location of one or more touches with good accuracy and resolution. Some capacitive systems can also detect the presence of objects other than a finger, such as a stylus used to perform various functions.

Use of a touchscreen as part of a display also allows an electronic device to change the display image, presenting different buttons, images, or other regions that can be selected, manipulated, or actuated by touch using one or more fingers. Touchscreens can therefore provide an effective user interface for cell phones, GPS devices, personal digital assistants (PDAs), personal computers and notebooks, ATM machines, and other such devices.

Touchscreens use various technologies to sense touch from a finger or stylus, such as resistive, capacitive, infrared, and acoustic sensors. Resistive sensors rely on touch to cause two resistive elements overlaying the display to contact one another completing a resistive circuit, while capacitive sensors rely on the capacitance of a finger changing the capacitance detected by an array of electrode elements overlaying the display device. Infrared and acoustic touchscreens similarly rely on a finger or stylus to interrupt infrared or acoustic waves across the screen, indicating the presence and position of a touch.

Capacitive and resistive touchscreens often use transparent conductors such as indium tin oxide (ITO) or transparent conductive polymers to form an array over the display image, so that the display image can be seen through the conductive elements used to sense touch. The size, shape, density, and pattern of circuitry have an effect on the resolution and accuracy of the touchscreen, as well as on the optical characteristics of the electrode elements overlaying the display. In general it is desirable to have a high density of electrodes distributed along both axes of the display, yet retain good optical properties such as freedom from visible lines and patterns caused by the electrodes optical properties. In some cases, optical properties are not important, for example in trackpads that do not overlay a display.

Although a single layer of most suitable conductive elements is difficult to see when overlaying a display, multiple layers obstruct more light and can therefore be easier to see. While in many cases the requirements call for a high density of electrodes for better resolution and accuracy, making the use of two or more layers unavoidable, there is a general desire to reduce the number of layers for optical reasons as well as for cost reduction.

Further, more complex patterns of touchscreen electrodes, and larger screen sizes, require more connecting lines to external circuitry; high connection counts require more layers or finer geometries for the requisite denser spacing, thereby costing more money and creating yield problems in manufacture.

Figure 4:
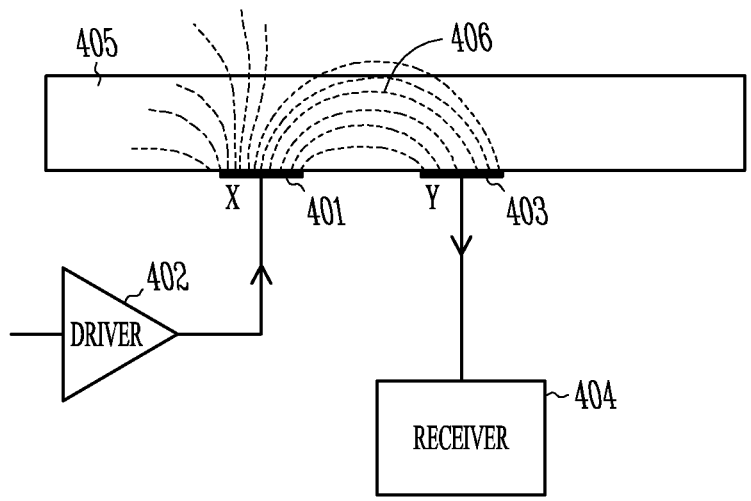
FIG. 4 shows a simple mutual capacitance touch sensing system according to an example embodiment.
Figure 5:
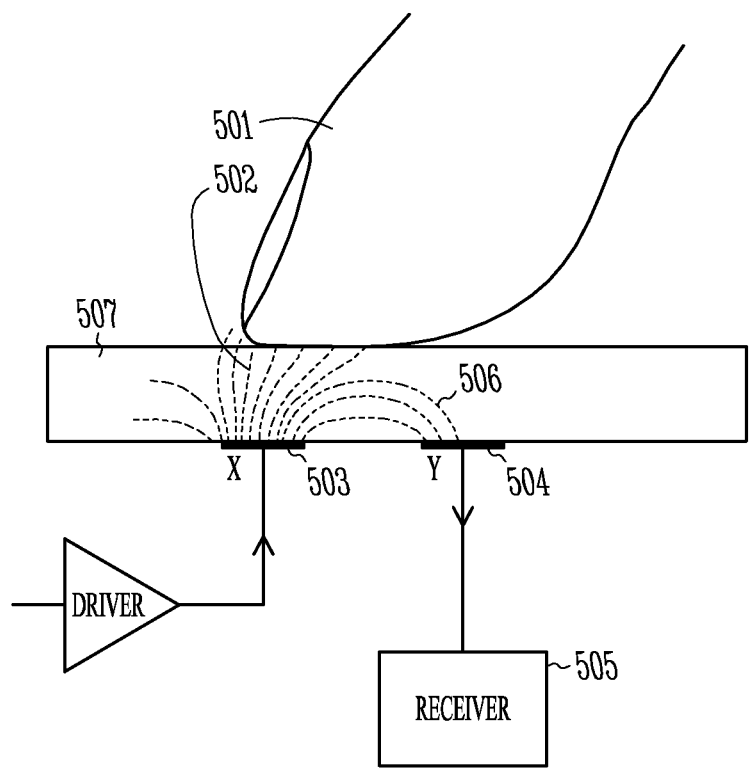
FIG. 5 shows the simple mutual capacitance touch sensing system of FIG. 4 with a finger present according to an example embodiment.

FIG. 1 shows a typical example of such a single-layer mutual capacitance touchscreen display, consistent with the prior art. Here, the capacitance between drive electrodes denoted with an "X" and various receive or sense electrodes designated with a "Y" is monitored, and a change in mutual capacitance between the electrodes indicates the presence and position of an input such as a finger or other object. In another variation the Y electrodes are driven electrodes and the X electrodes are receive electrodes; the pattern is fully reversible, however throughout this patent the convention of X as drive and Y as receive will be used to simplify discussion. Mutual capacitance sensor circuitry measures the capacitance between the X electrodes and the Y electrodes, which are covered by a dielectric overlay material that provides a sealed housing. When a finger is near the electrodes, field coupling between the X and Y electrodes is attenuated, as the human body conducts away a portion of the field that arcs between the X and Y electrodes, reducing the measured capacitive coupling between the X and Y electrodes. This is illustrated in FIGS. 4 and 5, and discussed in greater detail in the following description.

The X drive signals X1, X2, and X3 are here extended to various touchscreen drive elements using a resistor divider network chain of resistors 101, linking the elements between the X or drive electrodes and resulting in electrical interpolation of signals from the electrodes across the various X elements of the touchscreen. For example, the X element just below the X1 connection will receive a much stronger X1 drive signal than an X2 drive signal, and the proportion of X1 and X2 drive signal strengths that couple with the Y electrodes will indicate the relative vertical position of a finger on the display assembly shown. Similarly, a finger placed in the lower half of the display assembly of FIG. 1 will impact capacitive coupling between one of the X electrodes having some proportion of X2 and X3 drive signals, where the proportion indicates which X element is nearest the finger.

The X drive electrodes are driven using different series of pulses in one embodiment, such that a suitable number of pulses create an electric field that capacitively couples to the receiving Y electrode. The number of pulses needed is dependent on the geometry of the touchscreen electrodes, the dielectric front panel overlaying the electrodes, and other such performance and design characteristics. If each X drive electrode uses a different series of pulses, or is pulsed at different times, the presence and vertical position of a finger can be determined by observing which X drive signals have their capacitive coupling to the Y elements attenuated, and in what proportion the signals are attenuated.

The Y elements of FIG. 1 are similarly split into three regions and have a tapered geometry, such that a finger's presence on the far left side of the touchscreen will affect capacitive coupling between X electrodes and a Y1 sense electrode, a touch near the center of the touchscreen will affect capacitive coupling between X electrodes and a Y2 sense electrode, and a touch near the right side of the touchscreen will affect capacitive coupling between X electrodes and a Y3 sense electrode. Touches somewhere between the center and sides of the touchscreen will affect capacitive coupling in proportion to the area of the tapered Y electrodes under the finger, making horizontal estimation of the finger's position determinable by evaluating the proportion of Y1, Y2, and Y3 capacitive coupling that is disrupted due to the finger's presence.

The touchscreen of FIG. 1 relies on the presence of resistors 101 to interpolate the X drive signals between the various X elements of the touchscreen, requiring not only that various conductive traces be laid down to form the touchscreen, but that the X element conductive traces also be electrically coupled to a network of resistors or resistive material having resistances that are reasonably well controlled as to matching tolerance. This adds extra steps, and considerable cost and complexity to the production process, additionally it also compromises the performance of the sensing circuit, since the resistors introduce an elevated RC time-constant which requires more time to charge and discharge fully, thereby slowing down the acquisition process and potentially introducing other side effects such as increased noise susceptibility. While this design does in fact reduce wiring count thereby reducing space and some cost aspects, it introduces new problems and increases costs in other aspects.

One example touchscreen embodiment therefore uses capacitive touchscreen elements in progressively varying electrode densities or proportions across at least one dimension to provide varying field or sense proportional intensities across the touchscreen display.

Figure 2:
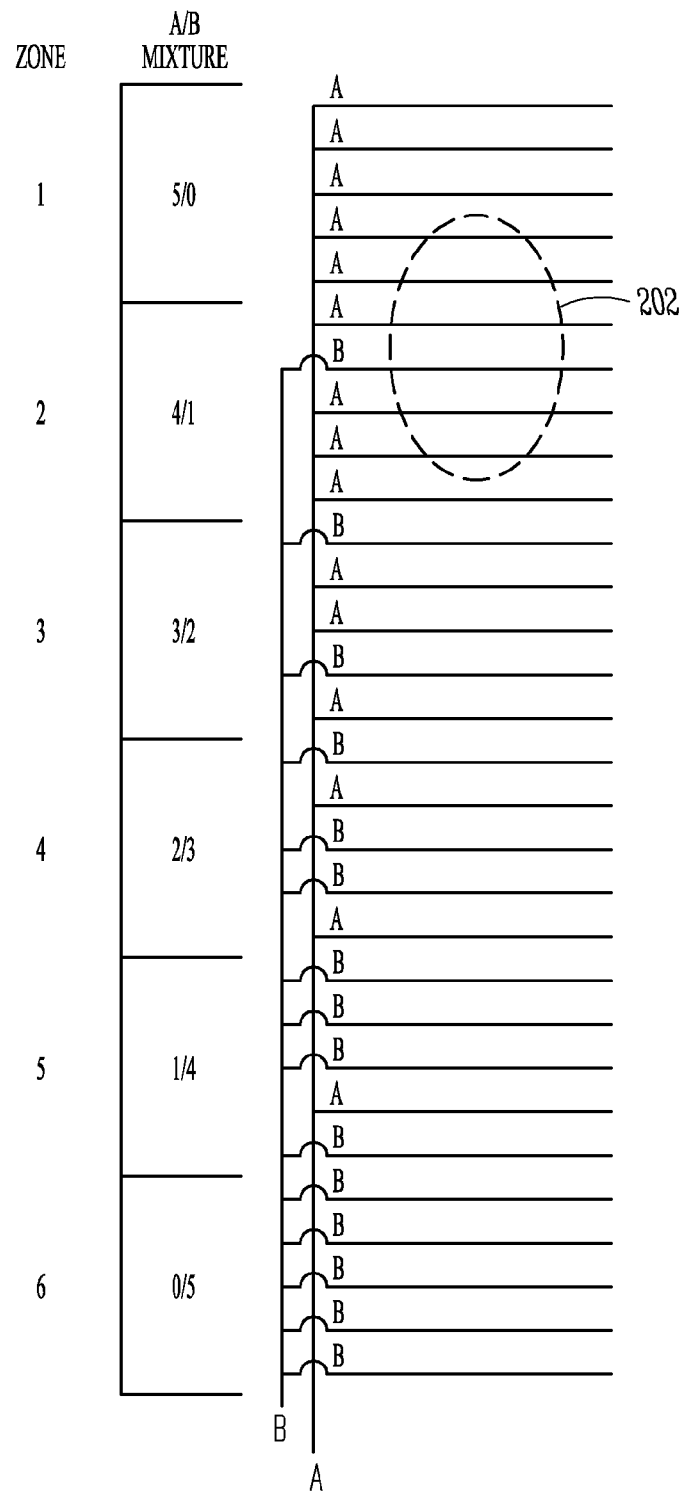
FIG. 2 shows first and second drive electrode arrays having electrode densities that progressively vary in distribution proportion according to an example embodiment.

FIG. 2 shows in plan view a linear capacitive touch slider 201, wherein two self-capacitance electrode sets A and B are configured with varying distributions along the long axis to effect a sensing gradient which can be interpreted by suitable capacitance sensing circuitry to report the centroid of finger touch 202 (in outline) along the long axis.

Notably the distribution of A and B electrodes can be conveniently organized into subgroups or zones, each zone having a varying ratio of A versus B electrode types. For example at the top of the slider in Zone 1, the ratio is 5:0 of A:B, i.e., there are five A electrodes in this space versus zero B electrodes. In Zone 2, the ratio is 4:1, and so on until zone 6 is reached where the ratio is 0:5. This modulation of electrode density, and appropriate placement of electrode types within each zone, facilitates a smooth, linear gradient for the purposes of touch reporting as will be seen.

Figure 3:
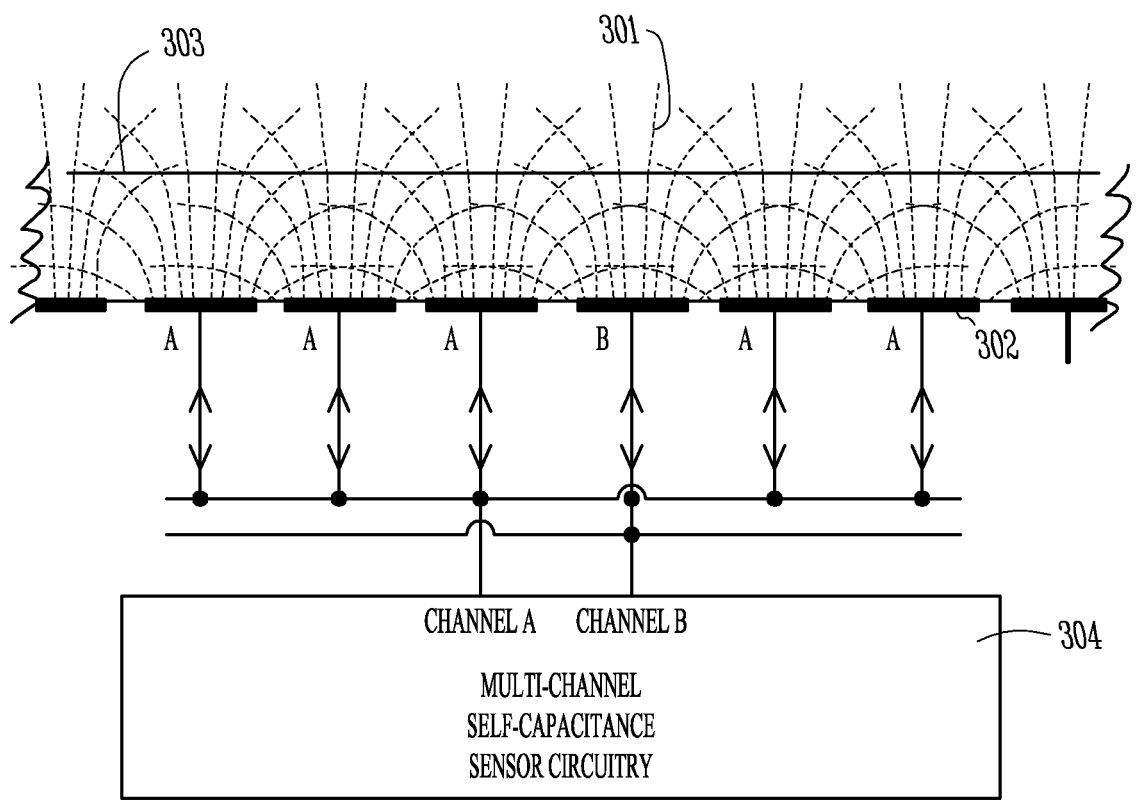
FIG. 3 illustrates electric fields emanating from electrodes in a self-capacitance touchscreen according to an example embodiment.

FIG. 3 shows the fields emanating from electrodes A of FIG. 2 in cross section along the area of touch 202 (but with no finger present). In self-capacitance systems, the electric fields 301 propagate outwards from the electrodes 302 in all directions; only field lines propagating into the panel are shown diagrammatically for clarity in FIG. 3. The fields propagating through panel 303 are those that can interact with a touch on the upper surface of 303; increases in field strength, i.e. increases in capacitance, result from touch in inverse proportion to the distance and proportional to the surface area of the finger, and which can be approximated according to the standard formula $Ct = \in A/d$, where:

Ct=the increase in capacitance for one sensing channel due to touch,

∈=relative permittivity of the panel material,

A=The intersecting surface area of the electrodes coupled to the sensing channel affected and the finger contact area, d=thickness of the dielectric panel The value Ct is only approximation, since the above formula does not include effects from fringe fields, human skin thickness and moisture content, human body to sensor return path coupling, and the like. Substantial variability in Ct may be observed over a broad range of parametric conditions, nevertheless the formula nevertheless represents a good first order approximation.

Sensing circuitry 304 has two channels, A and B, to drive the respective electrodes 302. The capacitive sensing circuitry 304 can be of any style known or unknown to the art, and is not important in understanding the invention.

FIG. 4 shows the field lines associated with electrodes with mutual capacitive coupling. Here, field lines from a driven electrode 401 (shown as X) operated by a driver 402 and a receive electrode 403 (shown as Y) coupled to a receiver 404, the fields penetrating through panel 405. A portion of the emitted field 406 escapes into free space or other parts of the panel as shown, however we are here primarily concerned with the part of the field which arcs from the X electrode to the Y electrode.

FIG. 5 shows the electrode configuration and circuit of FIG. 4 where the panel is touched by a finger. Here, the finger 501 causes field lines 502 normally coupling from drive electrode 503 to receive electrode 504 as shown at 506 to be absorbed by the finger 501. The result of this action is a very detectable decrease in signal level by receiver 505.

Figure 6:
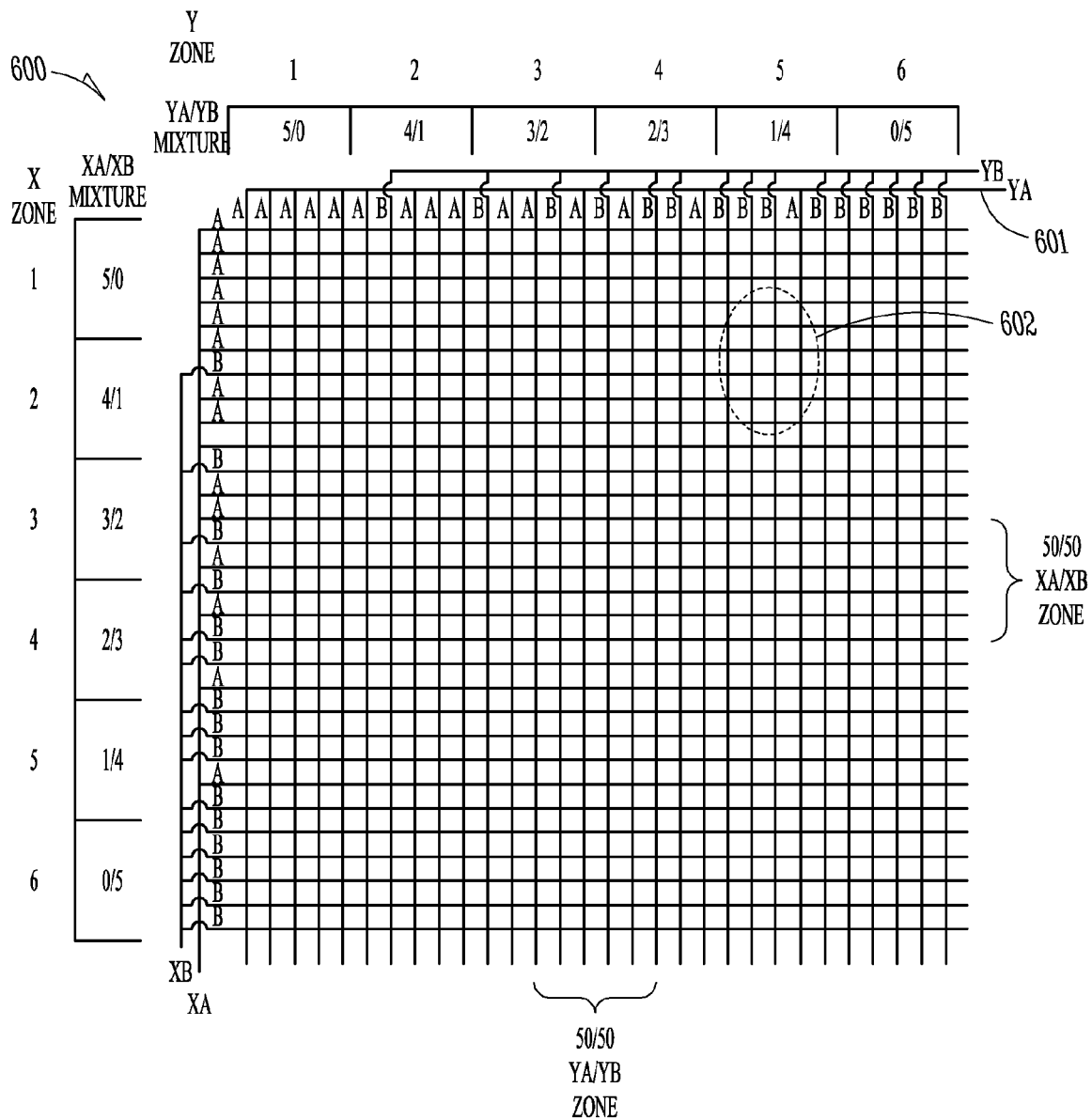
FIG. 6 illustrates a two-dimensional array of distribution modulated touchscreen electrodes according to an example embodiment.

FIG. 6 shows a 2-dimensional sensor array such as a touchscreen, wherein electrodes are arrayed along both the horizontal and vertical axes in a fashion similar to what is shown in FIG. 2. The touchscreen shown at 600 can be extended by adding more drive and receive channels, and the size of the panel is not limited to what is shown here. Crossovers 601 facilitate wiring along the periphery of the active area. A touch 602 creates signal changes on the XA, XB, YA, and YB electrodes so as to provide sufficient information to signal sensing and processing circuitry to locate the centroid of touch with good accuracy along both axes. In self capacitance mode, the electrodes XA and XB operate identically to YA and YB but are rotated, and use the same circuitry for example of type 304 of FIG. 3. The main sensing area of 600 as shown employs two sensing layers, one for X and one for Y electrode sets, or, employs a single layer with crossovers at each intersection of an X and a Y electrode.

The electrode array of FIG. 6 can also be operated in mutual capacitance mode, similar to that described in conjunction with FIG. 1. In this mode, the electrodes along one axis, for example those controlled by XA and XB, are driven to cause fields to be emitted into a panel such as 303 of FIG. 3. The other electrode array, for example YA plus YB, receive the electric fields from XA and XB; signals from YA and YB are acquired and processed to provide a location of touch along both the horizontal and vertical axis.

Figure 7:
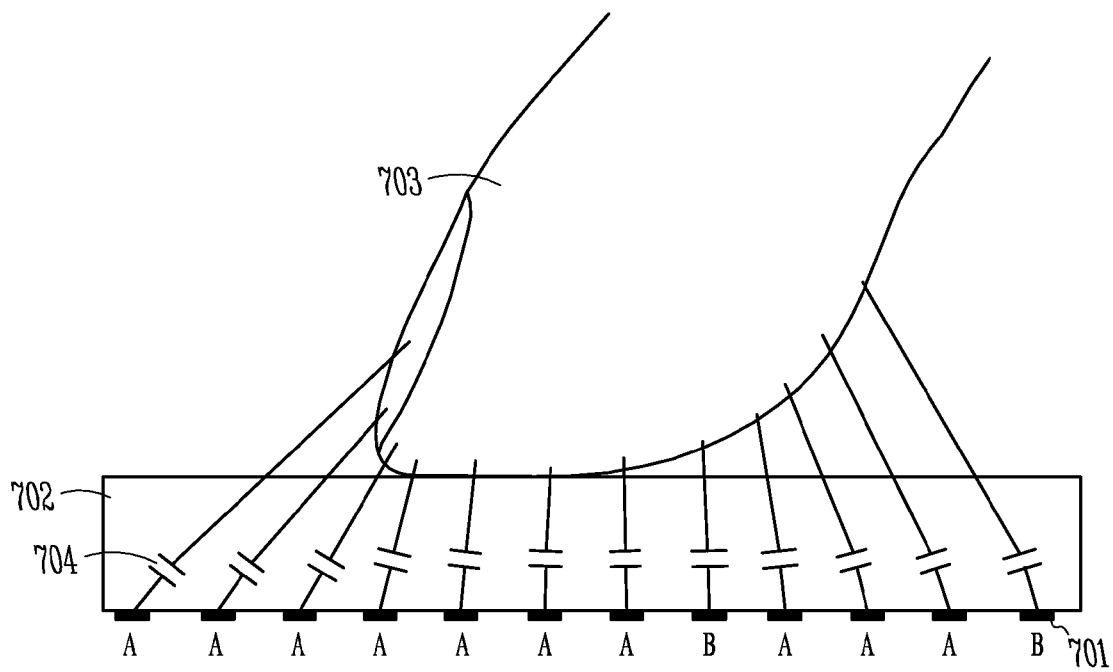
FIG. 7 illustrates finger interaction with capacitive touchscreen electrodes according to an example embodiment.
Figure 7:
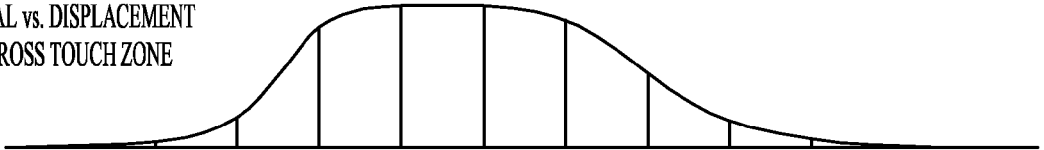

FIG. 7 shows use of intrinsic interpolation to achieve a smooth position response using self-capacitance. It should be understood that mutual capacitance uses similar principles, but the field lines arise from and are affected by slightly different principles. Here, electrodes 701 emit fields into space through the dielectric panel 702 including to a finger 703, the changes in strength of which can be modeled as a set of discrete 'disturbance capacitances'. The value of each disturbance capacitance is dependent on the degree of proximity of the finger 703 to each electrode in accordance with the discussion of FIG. 3.

Because each such capacitance 704 can be of any intermediate value, the displacement of touch location can be modeled as an interpolation problem where the point-by-point values are added and a ratio taken between the affected sensing channels. In the example shown, the weights of all A and B electrodes are separately summed intrinsically in the sensing process to arrive at two numbers, from which a ratiometric position can be derived. Since all A electrodes are connected together to one sensing channel, and all B electrodes are connected together to a second sensing channel, the detection circuitry has no need to know the individual signal deltas for each A or B sub-electrode in order to determine location of touch.

Furthermore, it should be clear that the 'core' area of touch, comprising the values from 15.8 to 17.2 in the example shown in FIG. 7, is not the sole determinant of signal strength; in fact, the fringe fields between the electrodes and the finger when an airgap exists are also important in locating touch, as these weaker signals contribute strongly in aggregate to the interpolative process, creating a smooth, non-granular positional response relative to the underlying granularity in electrode frequency and distribution. These fringe fields exhibit a largely Gaussian rolloff response in two dimensions, i.e., around the perimeter of the finger touch area, and exist in both self and mutual capacitance operating modes.

If mutual capacitance is employed the electrodes will exist as send/receive pairs and the signal levels will drop with increasing object proximity, however the interpolative principles are identical to that of self-capacitance including as to fringe-field effects, varying only in matter of degree. It should be understood that the position formula shown at 705 is only an example used for illustration and is not the only possible method to calculate position. In a 2D sensor array, the equations used to locate position can become quite sophisticated; the formula for computation is not critical, and discussion of the examples presented here do not limit the scope of the invention or claims.

FIGS. 4 and 5 are important to understanding the operation of the interpolative process described in association with FIG. 7, if FIG. 7 is operated using electrode pairs in a mutual capacitance mode rather than a self-capacitance mode as drawn. As mentioned previously, in a mutual capacitance implementation the electrodes of FIG. 7 would be replaced with alternating drive and receive electrodes from which the fields would arise.

FIG. 8 shows a group sequence of electrode wiring. The wiring sequence illustrated here can apply equally to self and mutual capacitance. FIG. 8 also shows that more than two electrode types can be used along each axis, for example in this example there are five channels of sensing, A-E. While FIG. 8 uses five groupings of five channels, other arrangements are possible, for example as shown in FIG. 9, which shows seven groupings of four channels. Arrangements can include any arbitrary number of elements per group and groups per screen axis, according to the needs of a particular design, however a reasonable group size might typically include at least 3 elements per group. It can also be understood from FIG. 8, that the plan layout of FIGS. 2 and 6 comprise but one zone of FIG. 8, for example from zone A1 to zone B1. Extensions in length can therefore be accommodated by means of added sensing channels, for example, channels C through E as shown in FIG. 8, without limit.

Figure 10:
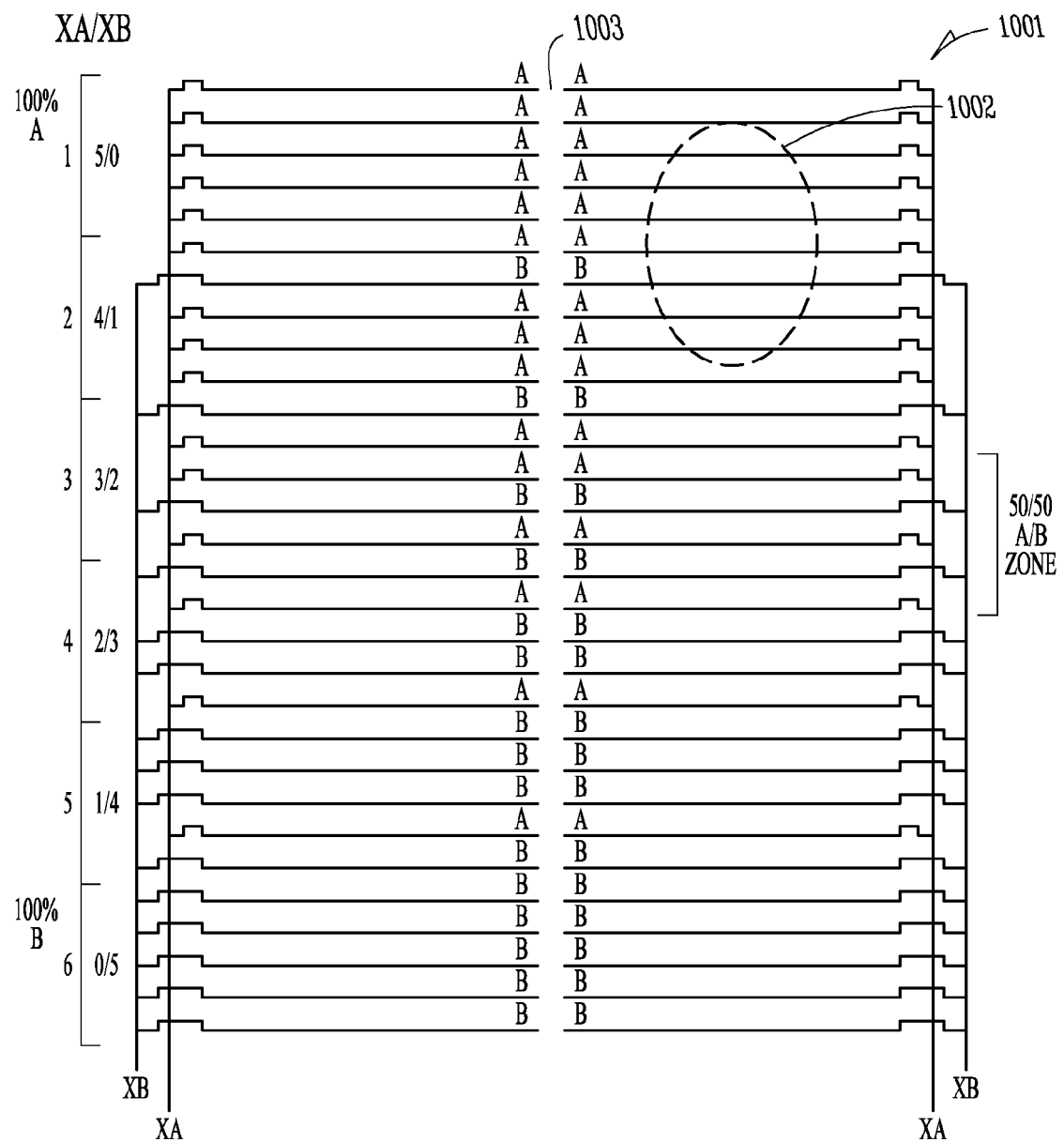
FIG. 10 illustrates first and second drive electrode arrays having electrode densities that vary in proportion progressively in the vertical direction according to an example embodiment.

FIG. 10 shows in plan view an electrode layer comprising two channels of mutual or self capacitance, XA and XB, arranged with a vertical split in the middle. Connections for XA and XB exist on the left and right sides, and it should be understood that XA on the left side is the same connection as XA on the right side, and similar for XB. This pattern is similar to FIG. 2 with the exception of the split arrangement as shown at 1003. This electrode layer 1001 on its own, can only resolve position along the vertical axis as drawn.

In a further example, two drive signals XA and XB drive two separate but interleaved arrays of horizontal X drive electrodes, as shown generally at 1001. When a finger touches the touchscreen such as at location 1002, the finger desirably interacts with several X drive electrodes, overlaying the XA and XB drive electrodes in proportion to the finger's position on the touchscreen. In this example, the electrodes coupled to the XA drive signal are in higher proportion near the top of the touchscreen, such that a person who touches the touchscreen in region 1002 intersects with approximately six or seven XA drive electrodes and only one XB drive electrode. The relative proportion of XA electrode intersected to XB electrode intersected suggests here that the finger is approximately one sixth XB and five sixths XA, or one sixth of the way down from the top of the touchscreen display.

Fine grain position information comes from intrinsic interpolation including from fringe fields as discussed in conjunction with FIG. 7. The electrode spacing and group extent along the vertical axis are typically optimized for smooth performance, for example by making the group extent no more than comparable in dimension to a longitudinal fingerprint chord. The vertical extent of the panel 1001 can be increased by the use of additional X drive electrodes, for example using an extended and/or enlarged sequence as shown in FIGS. 8 and 9.

In further embodiments, the drive electrodes of FIG. 10 are made of various materials such as indium tin oxide, conductive polymer, metal wire, or fine line metal. A more detailed example includes fine line metal electrodes that are approximately 10 micrometers in width or less, and occupy less than 10% of the total screen area, and in a further example less than 5%.

Figure 11:
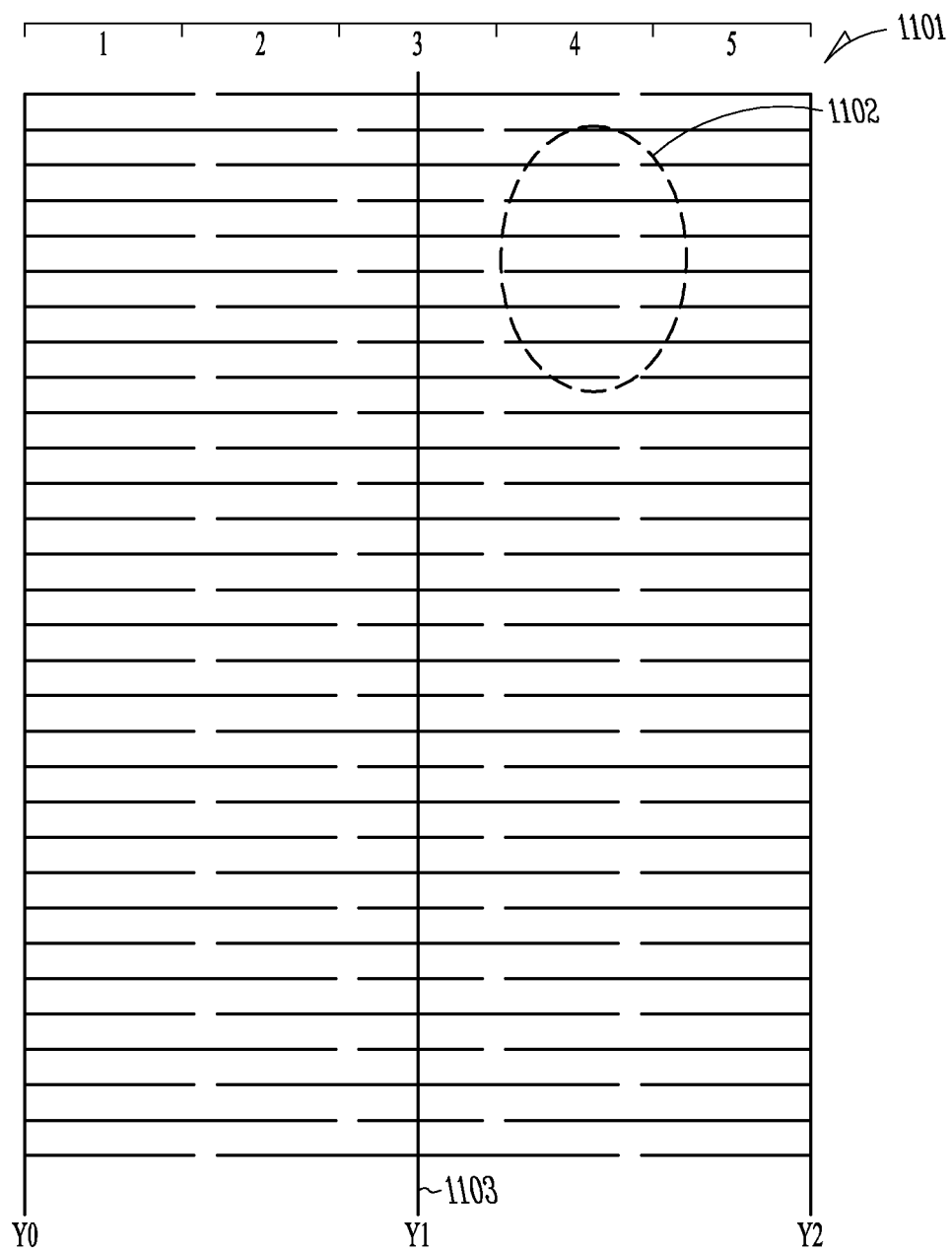
FIG. 11 illustrates a three-connection receive electrode configuration for a touchscreen display according to an example embodiment.
Figure 12:
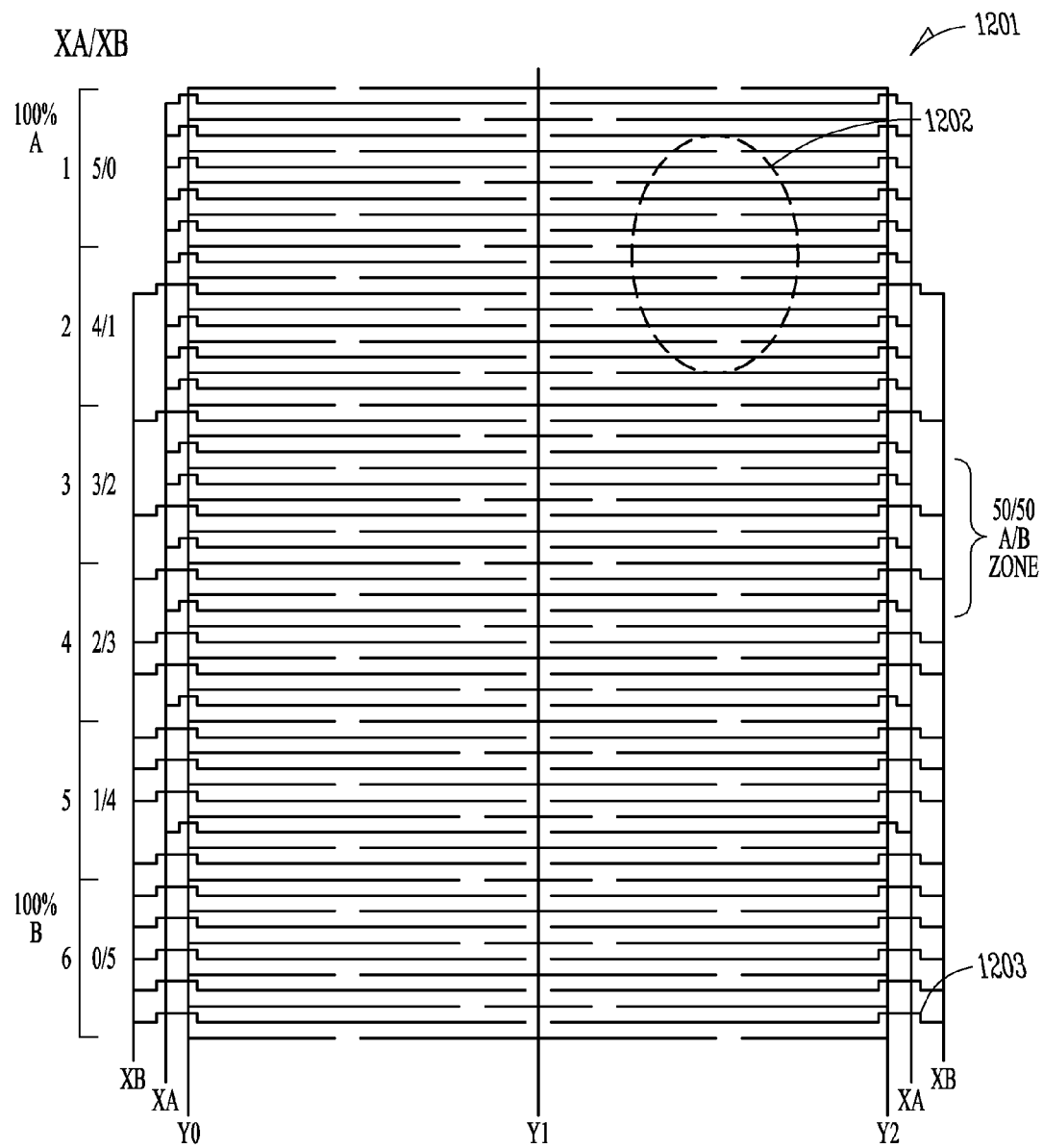
FIG. 12 illustrates a touchscreen display assembly comprising drive elements such as in FIG. 10 with receive elements such as in FIG. 11 so that the elements do not overlap in the touchscreen active area according to an example embodiment.

As discussed previously, the arrangement of FIG. 10 resolves position only along the vertical axis; the horizontal axis is provided by the plan layout of FIG. 11, which is interleaved with that of FIG. 10 to compose a single-layer layout shown in FIG. 12. The purpose of gap 1003 of FIG. 10 is to allow the spine 1103 of FIG. 11 to fit down the middle as shown in FIG. 12, to provide for three sensing channels along the horizontal axis.

In FIG. 11, three different receive electrodes Y0, Y1, and Y2 are coupled to the control circuitry, and the three electrodes are coupled to Y elements that are configured in an alternating pattern as shown generally at 1101 such that a the location of a finger touch 1102 covers varying proportions of different Y receive electrodes as it moves from side to side across the touchscreen display. For example, a touch in position 1102, covering mostly region 4 but also overlapping regions 3 and 5, covers somewhat more Y2 element electrodes than Y1 element electrodes. This indicates that the finger is slightly to the right of the center of region 4, toward the Y2 receive element side of the region.

The Y receive electrodes are therefore able to use interpolation of the finger's impact on capacitive coupling to determine the finger's position with greater accuracy than the five zones laid out in FIG. 11, much as interpolation or proportional measurements were used in FIG. 10 to determine the finger's position in the vertical axis using X drive electrodes. A relatively straightforward array of X drive electrodes as in FIG. 10 and Y receive electrodes as in FIG. 11 can therefore be combined to provide a high-performance touchscreen display with very good finger resolution capability along both axes, as is shown in FIG. 12.

The composite design of FIG. 12 therefore resides in one plane, except for crossovers 1203 on the periphery of the active area. The Y electrode layer shown in FIG. 11 uses alignment and length-modulation to achieve better interpolation; distribution modulation exists only on layer 10, as it is difficult to fashion 2-axis distribution modulation in a single layer. However, the design of FIG. 12 eliminates the need for resistors 101 of FIG. 1, yet provides similar resolution and accuracy in a single layer to the design of FIG. 1, even with one less X channel. Distribution modulation does not suffer from RC time constant problems introduced by the divider resistors of FIG. 1, thereby allowing for a greater extent of each drive channel than the resistive divider approach, resulting in fewer required drive channels over a given length of screen area.

Looking generally at the touchscreen display region 1201, the Y receive grid of FIG. 11 is laid in between the X drive electrodes of FIG. 10, such that the X drive electrodes and Y receive electrodes do not overlap in the display region. This enables formation of the entire electrode set on a substrate using a single process, such as by single pass metal or ITO deposition, resulting in a relatively efficient and inexpensive production process. Further, as electrodes do not cross within the display region, there are no regions of the touchscreen display that are more opaque than others, as there are no "stacked" or overlapping electrodes. The distribution of electrodes across the touchscreen display is also generally uniform, resulting in relatively uniform brightness across the touchscreen display.

In operation as a mutual capacitance touchscreen, a user of touchscreen display 1201 places a finger on or near the touchscreen, as shown at 1202. Different series of pulses are sent via the Xa and Xb drive electrodes, such that the mutual capacitance between the different X drive electrodes and Y conductors can be separately determined, such as by observation of an RC time constant, received pulse amplitude measurement, charge transfer measurement, or another suitable method. When the presence of a finger interrupts the field between the X and Y conductors as in FIG. 5, a reduction in observed coupling between the drive and receive electrodes is observed.

As noted previously, many designs such as that of FIG. 12 can operate in either self or mutual capacitance modes, and in mutual capacitance mode either the X or the Y electrodes can be the driven electrodes.

The touchscreen display of FIG. 12 has several advantages relative to that of FIG. 1, including the lack of a resistive material coupling the X drive electrodes to interpolate X drive signals between the X drive electrodes. Fewer different materials and process steps are therefore needed to form the touchscreen display of FIG. 12, and a reduced connection count simplifies connection to external drive and control circuitry.

Figure 13:
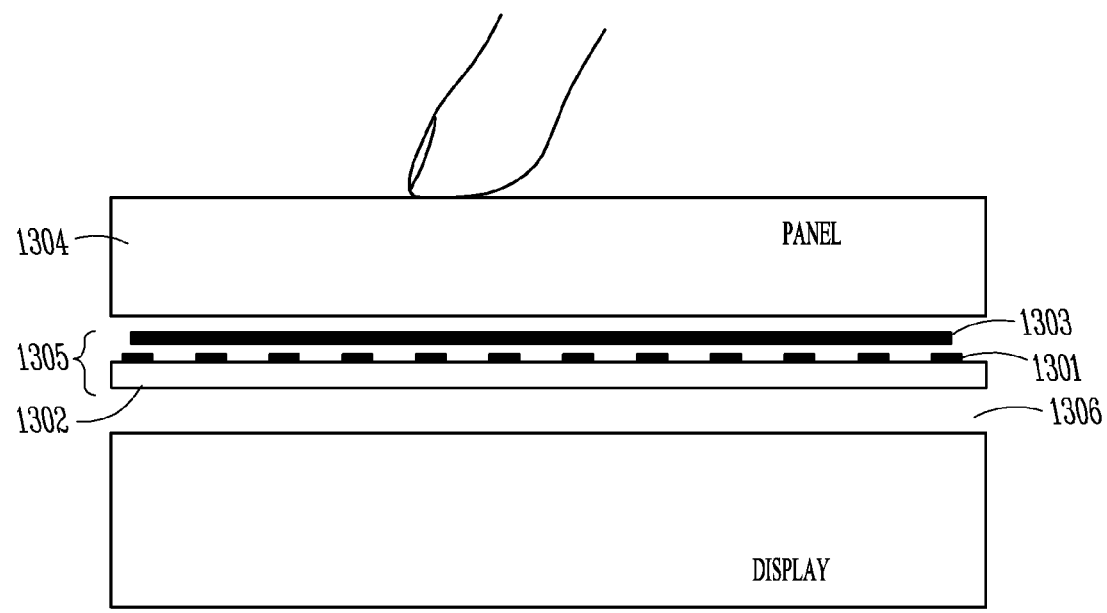
FIG. 13 shows a single layer touchscreen assembly overlaying a LCD display panel according to an example embodiment.

FIG. 13 shows one physical implementation of a single electrode layer stack over a display such as an LCD. The electrodes 1301 are printed or otherwise fashioned onto a substrate 1302, which in some embodiments is a clear plastic sheet such as PET or polycarbonate, or potentially a glass layer. Adhesive 1303 is used to bond substrate layer 1302 to panel 1304; 1303 may be a liquid adhesive, or an adhesive sheet. Assembly may be via a laminating process to provide for an airtight assembly. Electrodes 1301 may be fashioned from clear ITO, or from ultra fine line metal traces when used with a display. If no display is used, then the optical properties of assembly 1305 are not relevant and any set of suitable materials may be used. Gap 1306 is an airgap between the display and the assembly 1305, as is common in the art. In some cases is it advantageous to insert an adhesive layer in this gap and laminate the entire stack to the top of the display.

Figure 14:
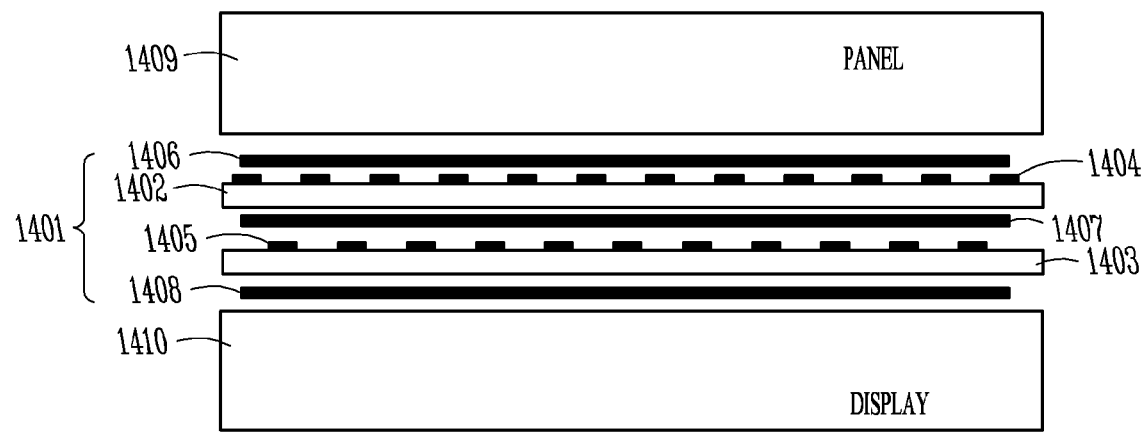
FIG. 14 shows an exploded view of a dual layer touchscreen assembly overlaying a LCD display panel according to an example embodiment.

FIG. 14 shows an assembly stack 1401 which contains two sensing layers, for example as may be used to implement a two-layer version of the design of FIG. 6. Two layers of plastic film are used, 1402 and 1403, with respective electrodes 1404 and 1405 fashioned thereon, and assembled with adhesive layers 1406, 1407 and optionally 1408 via a lamination process to panel 1409 and possibly also to display 1410.

Figure 15:
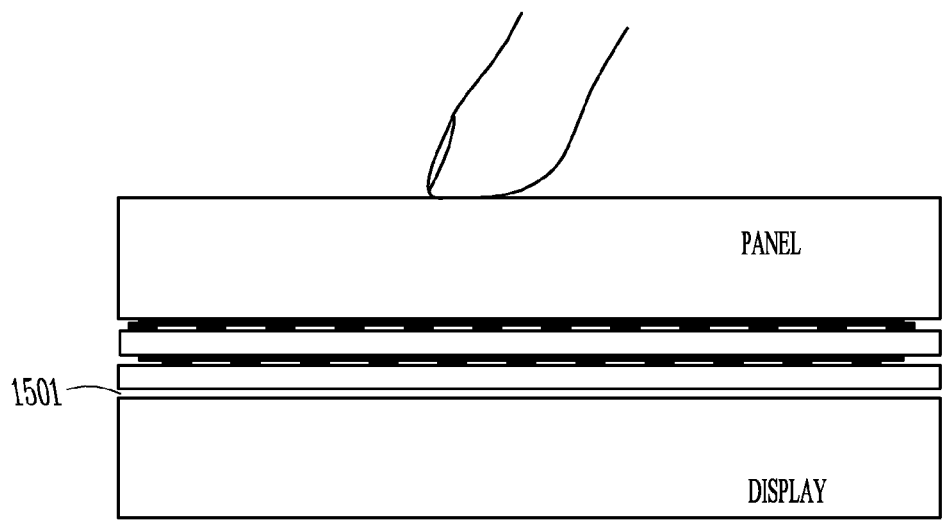
FIG. 15 shows the assembled dual layer touchscreen assembly of FIG. 14 according to an example embodiment.

FIG. 15 shows the layer stack of FIG. 14 as laminated together, but without the adhesive layer 1408, using instead an airgap 1501.

Figure 16:
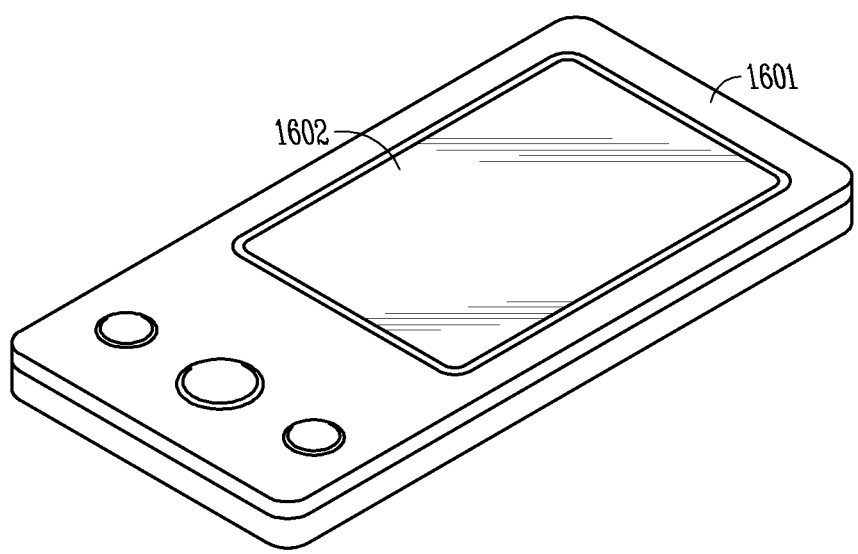
FIG. 16 shows a cellular telephone having a touchscreen display according to an example embodiment.

Touchscreens are often used in a variety of applications, from automatic teller machines (ATM machines), home appliances, personal digital assistants and cell phones, and other such devices. One such example cellular telephone or PDA device is illustrated in FIG. 16. Here, the cellular telephone device 1601 includes a touchscreen display 1602 comprising a significant portion of the largest surface of the device. The large size of the touchscreen 1602 enables the touchscreen to present a wide variety of images that can serve along with touchscreen capability to provide input to the device, including a keyboard, a numeric keypad, program or application icons, and various other interfaces as desired.

The user may interact with the device by touching with a single finger, such as to select a program for execution or to type a letter on a keyboard displayed on the touchscreen display assembly 1602, or may use multiple touches such as to zoom in or zoom out when viewing a document or image. In other devices, such as home appliances, the display does not change or changes only slightly during device operation, and may recognize only single touches.

Although the example touchscreen display of FIG. 16 is configured as a rectangular grid, other touch sensitive device configurations are possible and are within the scope of the invention, such as a touchwheel, a linear slider, buttons with reconfigurable displays, and other such configurations. Proportionate distribution of drive or receive electrodes coupled to different elements across the touch sensitive device can be adapted to any such shape, enabling detection of the region of input on the touchscreen.

In many embodiments, it is desirable that the conductive material be either transparent, such as Indium tin oxide or transparent conductive polymer, or be so small as to not significantly interfere with visibility of the display, such as with fine line metal.

Although the proportional element distribution touchscreen display assembly examples given here generally rely on mutual capacitance or self-capacitance to operate, other embodiments of the invention will use other technologies, including other capacitance measures, resistance, or other such sense technologies.

These example touchscreen assemblies illustrate how a touchscreen can be formed using an array of drive electrodes having a distribution modulation that enables determining an input position by the sensing gradient observed. The drive electrodes in a further example do not overlap in the active area or field of the touchscreen, eliminating the extra materials, expense, and production steps needed to form resistively-coupled element touchscreens such as that of FIG. 1. By not overlapping electrodes in the usable field, image quality is not degraded, and the relatively uniform electrode density of all electrodes across the touchscreen element avoids causing bright or dark regions in areas of varying electrode density when viewing the display through the touchscreen element.

Configurations such as the example of FIG. 12 provide an efficient system for generating an accurate reading of a finger's location on the touchscreen assembly. These benefits simplify operation of the touchscreen panel, as fewer connections and less filtering and other data processing are needed to ensure reliable touchscreen operation. This in turn leads to lower power consumption in an electronic device incorporating such a touchscreen display assembly, improving power efficiency, increasing battery life, and reducing resource use such as memory and processor consumption.

The invention claimed is:

1. An assembly, comprising:
   an array of first electrodes distributed across an active area of a touchscreen assembly such that the density of first electrodes increases in a first direction across the touchscreen;
   an array of second electrodes distributed across an active area of the touchscreen assembly such that the density of second electrodes decreases in the first direction across the touchscreen; and
   wherein the position in the first direction of an input on the touchscreen can be determined by the proportion of first and second electrode density in the area of the input.

2. The assembly of claim 1, wherein the first electrodes are directly coupled to one another and to a first external electrical connection and the second electrodes are directly coupled to one another and to a second external electrical connection.

3. The assembly of claim 1, wherein the density of first and second electrodes changes by varying the proportion of first and second electrodes present across the first direction.

4. The assembly of claim 1, further comprising an array of third electrodes distributed approximately evenly across the touchscreen; wherein the first and second electrodes are drive electrodes, and the third electrodes are receive electrodes such that the first and second electrodes.interact with the third electrodes via mutual capacitance to form a mutual capacitance touchscreen.

5. The assembly of claim 1, wherein at least one of the first and second electrodes comprise at least one of metal wire, fine line metal, indium tin oxide, and a conductive polymer.

6. The assembly of claim 1, wherein the first and second electrodes are nonintersecting in the active area of the touchscreen.

7. The assembly of claim 1, wherein the touchscreen assembly comprises at least one of a self- capacitance touchscreen, a mutual capacitance touchscreen, and a resistive touchscreen.

8. A method, comprising:
   driving an array of first electrodes with a first drive signal, the first electrodes distributed across an active area of a touchscreen assembly such that the density of first electrodes increases in a first direction across the touchscreen;
   driving an array of second electrodes with a second drive signal, the second electrodes distributed across an active area of the touchscreen assembly such that the density of second electrodes decreases in the first direction across the touchscreen; and
   wherein the position in the first direction of an input on the touchscreen can be determined by the proportion of first and second density in the area of the input.

9. The method of claim 8, wherein the first electrodes are directly coupled to one another and to the first drive signal, and the second electrodes are directly coupled to one another and to the second drive signal.

10. The method of claim 8, wherein the density of first and second electrodes changes by varying the proportion of first and second electrodes present in the first direction.

11. The method of claim 8 receiving a mutual capacitive coupled signal from at least one of the first and second electrodes in an array of third electrodes distributed approximately evenly across the touchscreen, such that the first and second electrodes interact with the third electrodes via mutual capacitance to form a mutual capacitance touchscreen.

12. The method of claim 8, wherein the first, second, and third electrodes are nonintersecting in the active area of the touchscreen.

13. A method, comprising:
   forming an array of first electrodes distributed across an active area of a touchscreen assembly such that the density of first electrodes increases in a first direction across the touchscreen;
   forming an array of second electrodes distributed across an active area of the touchscreen assembly such that the density of second electrodes decreases in the first direction across the touchscreen; and
   wherein the position in the first direction of a finger on the touchscreen can be determined by the proportion of first and second electrode density in the area of the finger.

14. The method of claim 13, further comprising:
   directly coupling the first electrodes to one another and to a first external electrical connection; and
   directly coupling the second electrodes to one another and to a second external electrical connection.

15. The method of claim 13, further comprising forming an array of third electrodes distributed approximately evenly across the touchscreen, such that the first and second electrodes interact with the third electrodes via mutual capacitance to form a mutual capacitance touchscreen display.

16. The method of forming a touchscreen of claim 15, wherein at least one of the first, second, and third electrodes comprise at least one of fine line metal, indium tin oxide, and a conductive polymer.

17. The method of forming a touchscreen of claim 15, wherein the first, second, and third electrodes are nonintersecting in, the active area of the touchscreen.

18. An electronic device comprising:
   a touchscreen display comprising an array of first and second electrodes;
   the array of first electrodes distributed across an active area of the touchscreen display assembly such that the density of first electrodes increases in a first direction across the touchscreen;
   the array of second electrodes distributed across an active area of the touchscreen display assembly such that the density of second electrodes decreases in the first direction across the touchscreen; and
   wherein the position in the first direction of an input on the touchscreen can be determined by the proportion of first and second electrode density in the area of the input.

19. The electronic device of claim 18, further comprising an array of third electrodes distributed approximately evenly across the touchscreen such that the first and second electrodes interact with the third electrodes via mutual capacitance to form a mutual capacitance touchscreen display.

20. The electronic device of claim 18, wherein the device comprises at least one of a cellular telephone, a personal digital assistant, an appliance, a computer, an automatic teller machine, and a kiosk.

21. An assembly, comprising:
   an array comprising one or more pairs of first and second electrodes distributed across an active area of a touchscreen, such that the position of an input on the touchscreen can be determined by the proportion of first and second electrode density in the area of the input.

22. The method of claim 13, wherein the density of first and second electrodes is changed by varying the proportion of first and second electrodes formed across the first direction.

* * * * *